US 6,529,671 B2

(12) United States Patent
MacDougall

(10) Patent No.: US 6,529,671 B2
(45) Date of Patent: Mar. 4, 2003

(54) PASSIVELY COMPENSATED OPTICAL FIBERS

(75) Inventor: Trevor W. MacDougall, Simsbury, CT (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/776,047

(22) Filed: Feb. 1, 2001

(65) Prior Publication Data

US 2002/0181926 A1 Dec. 5, 2002

Related U.S. Application Data

(62) Division of application No. 09/040,090, filed on Mar. 17, 1998, now abandoned.

(51) Int. Cl.[7] .................................................. G02B 6/34
(52) U.S. Cl. .......................................... 385/137; 385/37
(58) Field of Search ............................. 385/137, 37, 10, 385/28, 50, 32, 39, 136

(56) References Cited

U.S. PATENT DOCUMENTS

| 4,593,969 A | | 6/1986 | Goodman et al. |
| 4,636,031 A | | 1/1987 | Schmadel, Jr. et al. |
| 5,042,898 A | | 8/1991 | Morey et al. |
| 5,367,589 A | | 11/1994 | MacDonald et al. |
| 5,430,817 A | | 7/1995 | Vengsarkar |
| 5,469,520 A | | 11/1995 | Morey et al. |
| 5,641,956 A | * | 6/1997 | Vengsarkar et al. ... 250/227.14 |
| 5,694,503 A | | 12/1997 | Fleming et al. |
| 5,703,978 A | | 12/1997 | DiGiovanni et al. |
| 5,757,540 A | | 5/1998 | Judkins et al. |
| 5,841,920 A | | 11/1998 | Lemaire et al. |
| 5,926,599 A | | 7/1999 | Bookbinder et al. |
| 5,987,200 A | | 11/1999 | Fleming et al. |
| 5,991,483 A | | 11/1999 | Engelberth |
| 5,999,671 A | | 12/1999 | Jin et al. |
| 6,055,348 A | * | 4/2000 | Jin et al. ....................... 385/37 |
| 6,128,424 A | * | 10/2000 | Espindola et al. ............. 385/37 |
| 6,137,932 A | * | 10/2000 | Kim et al. ..................... 385/37 |
| 6,181,852 B1 | * | 1/2001 | Adams et al. ................. 385/15 |
| 6,266,462 B1 | * | 7/2001 | Kim et al. ..................... 385/28 |
| 6,278,819 B1 | * | 8/2001 | Reddy .......................... 385/37 |

FOREIGN PATENT DOCUMENTS

| EP | 0 767 391 A2 | 9/1996 |
| WO | WO 97/28480 | 7/1997 |

OTHER PUBLICATIONS

A.M. Vengsarkar, "Long–Period Fiber Gratings", Optical Society of America Technical Digest, Bragg Gratings, Photosensitivity and Poling in Glass Fibers and Waveguides: Applications and Fundamentals, Oct. 26–28, 1997, pp. 12/BsuB1–1—BsuBl–4/15.

H.J. Patrick et al., "Hybrid Fiber Bragg Grating/Long Period Fiber Grating . . . Strain/Temperature Discrimination", IEEE Photonics Technology Letters, vol. 8, No. 9, Sep. 1996, pp. 1223–1225.

A.M. Vengsarkar et al., "Long–Period Fiber Gratings as Band–Rejection Filters", IEEE Journal of Lightwave Technology, vol. 14, No. 1, Jan. 1996, pp. 58–65.

V. Bhatia et al., "Standard Optical Fiber Long–Period Gratings . . . and Refractive Index Sensing", Proceedings of the 1997 Conference on Optical Fiber Communications, Feb. 1997, pp. 346–347.

* cited by examiner

Primary Examiner—Frank G. Font
Assistant Examiner—Michael P Mooney
(74) Attorney, Agent, or Firm—Nestor F. Ho

(57) ABSTRACT

A passively compensated optical fiber includes an optical fiber and a support member attached to the optical fiber at a first attachment point and at a second attachment point. The distance between the first attachment point and the second attachment point increases with increasing temperature due to expansion of the support member.

3 Claims, 4 Drawing Sheets

PASSIVELY COMPENSATED OPTICAL FIBERS

This is a division of application Ser. No. 09/040,090, filed Mar. 17, 1998, now abandoned.

BACKGROUND OF THE INVENTION

The invention relates to optical fibers and long-period gratings.

Optical fibers are used to guide light which might, typically, be an optical signal used in telecommunications. In general, an optical fiber includes an inner core and an outer clad having an index of refraction less than the inner core. The difference in the index of refraction creates internal reflections forcing the light to propagate along the inner core and preventing it from leaking out of the fiber.

Some optical fibers include long-period gratings (LPG). A long period grating is formed by producing a series of perturbations in the index of refraction of the inner core. It is well known in the art how to produce optical fibers having long-period gratings, e.g., as described in U.S. Pat. No. 5,430,817. In general, the optical fibers are made from high purity $SiO_2$ or other optical materials, e.g., germanosilicate. The long-period gratings can be made by first loading the fibers with hydrogen or deuterium and then selectively exposing the core of an optical fiber to ultra-violet light. Typically, the perturbations are formed by exposing the core through the cladding to an intensity pattern which is produced by transmitting an ultra-violet beam directed through an amplitude mask. The spacing of the perturbations creates a grating characterized by a center wavelength at which light will no longer propagate through the optical fiber. Long-period gratings with different perturbation spacings have different center wavelengths. In general, long-period gratings are those in which the spacing of the perturbations is at least 10 times larger than the wavelength of input light. Typically, the period is in the range 15–1500 $\mu$m for center wavelengths between 700 and 1500 nm. In addition, long-period gratings can have a span of perturbations extending for a few cm.

Long-period gratings are used in optical fibers to filter out selected wavelengths from an optical signal, e.g., like a notch filter. As an optical signal propagates through the core and encounters a long-period grating, specific wavelengths of light, i.e., the center wavelength of the grating, are converted from a guided mode of the core to a non-guided mode of the cladding. A guided mode propagates through the core of the optical fiber. A non-guided mode of the cladding dissipates through the cladding and does not propagate through the optical fiber. The center wavelength conversion from a guided mode to a non-guided mode is a function of the perturbation spacing and the difference in the effective index of refraction between the guided and non-guided mode. Typically, for a single mode optical fiber, there is only one core guided mode, but several cladding non-guided modes. In addition, each non-guided mode of cladding is characterized by an unique effective index of refraction. Therefore, for a given perturbation spacing, there are several non-guided cladding modes, and thus, several center wavelengths at which light is converted from a guided mode to non-guided modes. In addition, for a given center wavelength, there are several perturbation spacings at which light is converted from a guided mode to non-guided mode.

Optical fibers having long-period gratings are useful as amplified spontaneous emission (ASE) filters, erbium-doped fiber amplifier (EDFA) gain equalizers and sensors. The use of optical fibers having long-period gratings continues to increase. Long-period gratings, however, are sensitive to changes in temperature. Typically, a central wavelength of 1550 nm shifts by 2 to 30 nm per 100° C. change in temperature. It is important, for instance, in telecommunication applications that the central wavelength of the long-period grating be constant over temperature ranges of 100° C.

SUMMARY OF THE INVENTION

In general, in one aspect, the invention features a passively compensated optical fiber having an optical fiber and a support member. The support member is attached to the optical fiber at a first attachment point and at a second attachment point. The distance between the first attachment point and the second attachment point increases with increasing temperature due to expansion of the support member.

The passively compensated optical fiber includes a stainless steel, aluminum, or copper support attached with an epoxy to the optical fiber at two points. The epoxy can be ultra-violet curable. The passively compensated optical fiber also includes a coating, an outer core, and an inner core. The inner core includes a long-period grating between the first attachment point and the second attachment point.

In another aspect, the invention features a method of fabricating a passively compensated optical fiber. The method includes identifying the strain response and thermal response for a long-period grating having a central wavelength, choosing a support member having a coefficient of linear expansion which compensates the optical fiber, and attaching the optical fiber to the support member at a first attachment point and at a second attachment point.

In another aspect, the invention features a method of fabricating a passively compensated optical fiber. The method includes calculating an optical fiber design for compensating an optical fiber having a center wavelength and a substrate having a coefficient of thermal expansion, manufacturing an optical fiber having a long-period grating fabricated using the calculated optical fiber design, and attaching the fabricated optical fiber to a support member at a first attachment point and at a second attachment point.

In another aspect, the invention features a method of compensating an optical fiber. The method includes providing an optical fiber, attaching the optical fiber at a first attachment point and at a second attachment point, and increasing the distance between the first attachment point and the second attachment point in response to an increase in temperature.

Preferably, the method of compensation is done passively.

The invention provides a passively compensated LPG device by attaching an optical fiber having a LPG to a thermally expanding support.

DESCRIPTION OF THE PREFERRED EMBODIMENTS

Figure 1:
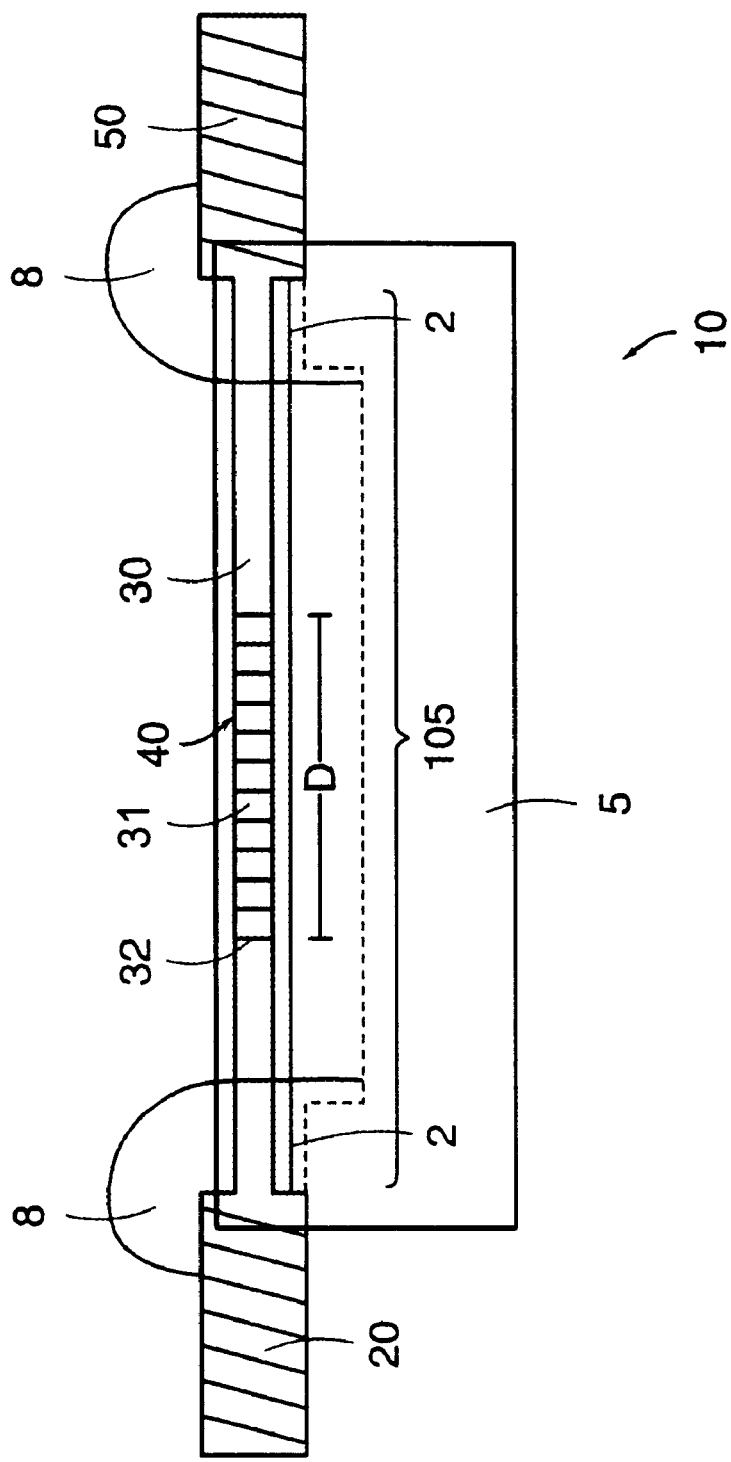
FIG. 1 is a schematic view of a passively compensated long-period grating device.

Referring to FIG. 1, a passively compensated LPG device 10 includes an optical fiber 20 having a core 30, a cladding 40, and a coating 50 for protecting the optical fiber 20. Core 30 includes a long-period grating 31 having a plurality of refractive index perturbations 32 spaced along the central axis of LPG device 10 for a distance, D. A section 105 of the coating 50 surrounding the long-period grating 31 is removed to expose the cladding 40. The exposed cladding 40 is attached at a first point 2 and at a second point 4 to a support 5 with an adhesive 8.

As the temperature changes, the central wavelength of the LPG 31 shifts, e.g., to longer wavelengths. In LPG device 10, strain applied to the LPG 31 by the thermal expansion of support 5 shifts the central wavelength in the opposite direction, e.g., to shorter wavelengths. Therefore, a shift in the central wavelength due to temperature can be negated or compensated by applying strain to LPG 31. As temperature changes, support 5 expands, i.e., the distance between first point 2 and second point 4 increases. The expansion creates a strain which is transferred through adhesive 8 to cladding 40, core 30, and LPG 31. The strain transferred to the LPG 31 from the thermally expanding support 5 negates or compensates the central wavelength shift of the long-period grating 31 due to temperature.

The response of the central wavelength to changes in temperature and strain are used to determine the amount of applied strain needed to compensate a shift in the central wavelength. The affect of temperature and strain on the center wavelength is:

$$d\lambda = \frac{d\lambda}{dT} \Delta T + \frac{d\lambda}{d\epsilon} \Delta \epsilon \qquad (1)$$

where $d\lambda/dT$ is the change in the central wavelength per change in temperature, referred to as the thermal coefficient, and where $d\lambda/d\epsilon$ is the change in the central wavelength per change in strain, referred to as the strain coefficient. $\Delta \epsilon$ is equal to the strain applied to the grating and $\Delta T$ is equal to the temperature change. An optical fiber with a LPG has a positive thermal coefficient. An optical fiber with a LPG can have either a positive or negative strain coefficient. For passive compensation, the optical fiber with a LPG is designed such that the optical fiber has a negative strain coefficient. The design of the optical fiber will be discussed in further detail below. All of the temperature effects (i.e., the change in the index of refraction of the core and of the cladding as well as thermal expansion of the glass) are included in the temperature coefficient. Similarly, all of the strain effects (i.e., the change in the index of refraction of the core and of the cladding as well as the change in the spacing of the grating) are included in the strain coefficient.

The strain and temperature effects are compensated when there is no change in the center wavelength, i.e., when $d\lambda=0$. Rearranging Eq. 1, compensation is achieved when $$\frac{d\lambda}{dT} \Delta T + \frac{d\lambda}{d\epsilon} \Delta \epsilon$$

Eq. 2 is rearranged to yield:

$$-\frac{d\lambda/dT}{d\lambda/d\epsilon} = \frac{\Delta \epsilon}{\Delta T} = CTE \qquad (3)$$

The ratio of the thermal coefficient and the strain coefficient is negative because $d\lambda/d\epsilon<0$. Thus, the left hand side of Eq. 3 is positive and is equal to the ratio of strain applied to the grating, $\Delta \epsilon$, per change in temperature, $\Delta T$. The ratio $\Delta \epsilon/\Delta T$ is also equal to the coefficient of thermal expansion (CTE) of a material. Therefore, compensation occurs when an optical fiber with an LPG is attached to a support having a CTE equal to the left hand side of Eq. 3.

Referring back to FIG. 1, a passively compensated LPG device 10 is manufactured from an optical fiber 20 having a 58 micron thick cladding 30 and a 9 micron thick core 40. The cladding is fabricated from $SiO_2$ and the core is fabricated from $SiO_2$ doped with $GeO_2$. The effective index of refraction of the core is 1.45 and the effective index of refraction of the cladding is 1.4446. Core 40 includes a LPG 31 having a plurality of refractive index perturbations 32 spaced by, 70.5 microns, along the central axis of LPG device 10 for 2.5 cm. A 45 mm section 105 of coating 50 surrounding LPG 31 is removed. The thermal and strain coefficients of optical fiber 20 are measured as 0.048 nm/° C. and −0.0028 nm/microstrain. These values are used in Eq. 3 to determine the CTE value needed for compensation. Optical fiber 20 is attached at a first point 2 10 mm from one end of LPG 31 and at a second point 10 mm from the other end of LPG 31. The fiber is attached with a UV curable adhesive 8, e.g., EMCAST 1060A from Electronic Materials, located in Breckenridge, Colo., to an aluminum support 5 having a CTE of 24 microstrain/° C. Adhesive 8, typically, is attached to the cladding 40 of optical fiber 100 approximately 10 mm from either end of LPG 31.

Figure 2:
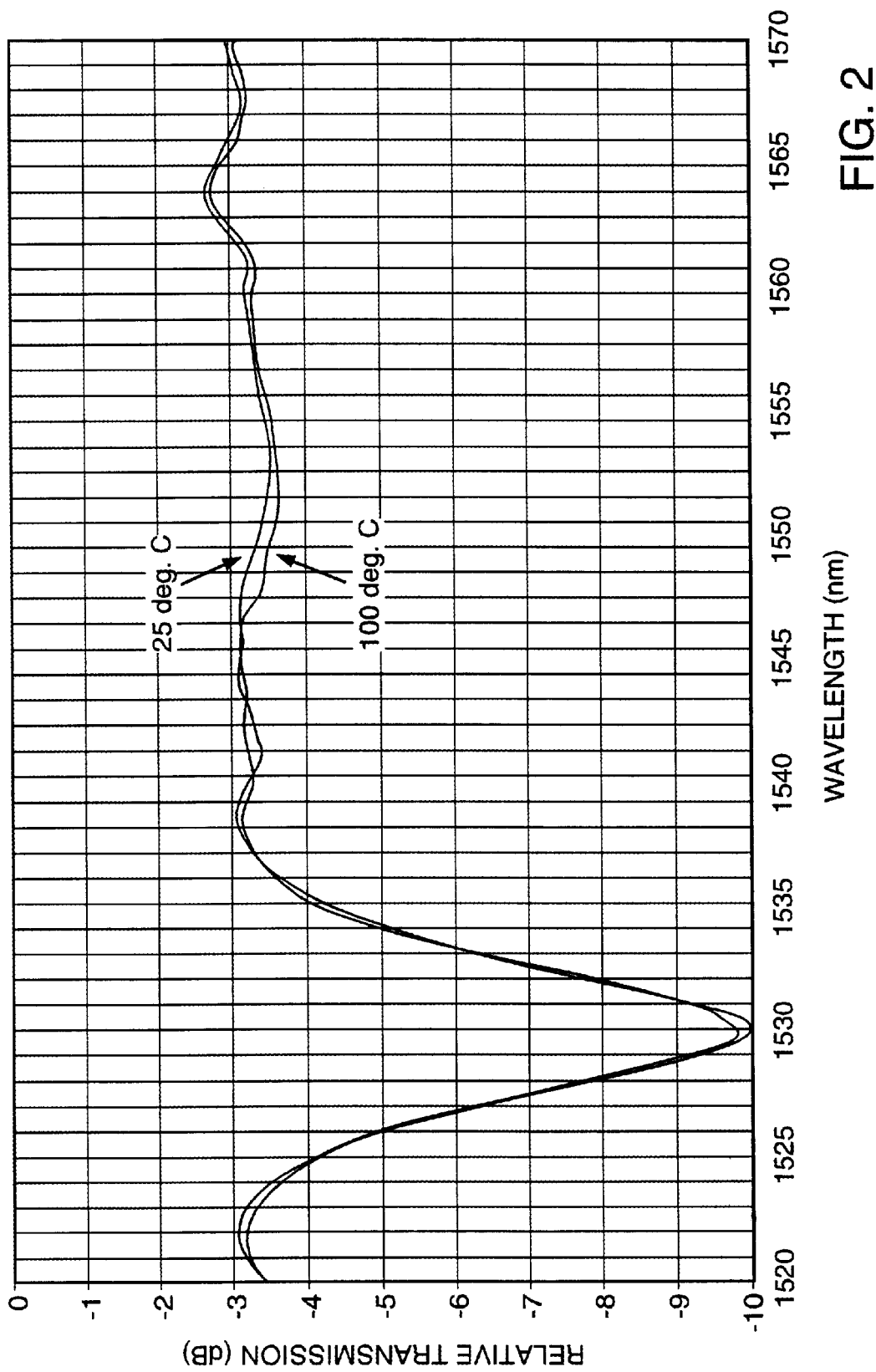
FIG. 2 is a plot of the transmission output signal of a passively compensated long-period grating device at 250° C. and 100° C.

Referring to FIG. 2, the center wavelength of stabilized LPG device 10 is monitored as the temperature is increased from 250° C. to 100° C. The change in center wavelength per change in temperature is measured as 0.0017 nm/° C. The stabilized LPG device results in reduction, by a factor of 25, of the center wavelength's sensitivity to temperature changes.

The support is made of any material, e.g., stainless steel, aluminum, or brass, having a CTE which satisfies Eq. 3, for an optical fiber with a LPG having measured coefficients of temperature and strain. The range of CTE values, however, is limited to the CTE values of known support materials. Therefore, a support material having a CTE equal to the ratio of measured thermal and strain coefficients for an optical fiber might not exist. In this case, either the support having the CTE which best satisfies Eq. 3 is used or an optical fiber with a LPG having a different perturbation spacing is manufactured. In general, optical fibers manufactured with smaller perturbation spacing can be compensated by using existing support materials. For example, assume that one optical fiber (Fiber A) with a center wavelength of 1800 nm is fabricated with a perturbation spacing of 100 microns and another optical fiber (Fiber B) with a center wavelength of 1800 nm is fabricated with a perturbation spacing of 300 microns. Of the two fibers, Fiber A is more likely to be compensated by using existing support material than is Fiber B, because Fiber A has a smaller perturbation spacing.

Whether one can compensate an optical fiber having a particular perturbation spacing and center wavelength is calculable. The coefficients of temperature and strain are affected by the design of the optical fiber, e.g., geometry, materials, and perturbation spacing. Compensation as defined in Eq. 3, is also related to the change in the index of refraction of the optical fiber by:

$$CTE = -\frac{\frac{dn_{SiO_2}}{dT}\left(1 - \frac{dn_{effclad}}{dn_{SiO_2}}\right)}{d\lambda/dL} \quad (4)$$

where $n_{SiO2}$ is the index of refraction of fused silica, $dn_{SiO2}/dT$ is $6.7\times10^{-6}$ per ° C., and $d\lambda/dL$ is the change in the center wavelength per change in the perturbation spacing of the LPG. The CTE values of the support materials are known, e.g., stainless steel has a CTE value of 11 microstrain/° C. The two remaining unknown quantities, $dn_{effclad}/dn_{SiO2}$ and $d\lambda/dL$, are different for each non-guided cladding mode, but they are calculable. In addition, there are several non-guided modes for which a center wavelength is coupled from a guided mode. Therefore, the non-guided mode having a $dn_{effclad}/dn_{SiO2}$ and $d\lambda/dL$ which comes closest to satisfying Eq. 4, for a given center wavelength, is chosen.

The quantities $dn_{effclad}/dn_{SiO2}$ and $d\lambda/dL$ are calculated by solving an eigenvalue problem which takes into account the geometry of the fiber, the index of refraction of the core, the index of refraction of the cladding, and the index of refraction of bulk $SiO_2$. The process of setting up and solving eigenvalue calculations is similar to the processes described in setting up the equations for fiber optic modeling and in solving eigenvalue problems found in Monerie, IEEE J. Q. Electronics CE-18, p.535 (1982), and in Snyder and Love, *Optical Waveguide Theory*.

Figure 3:
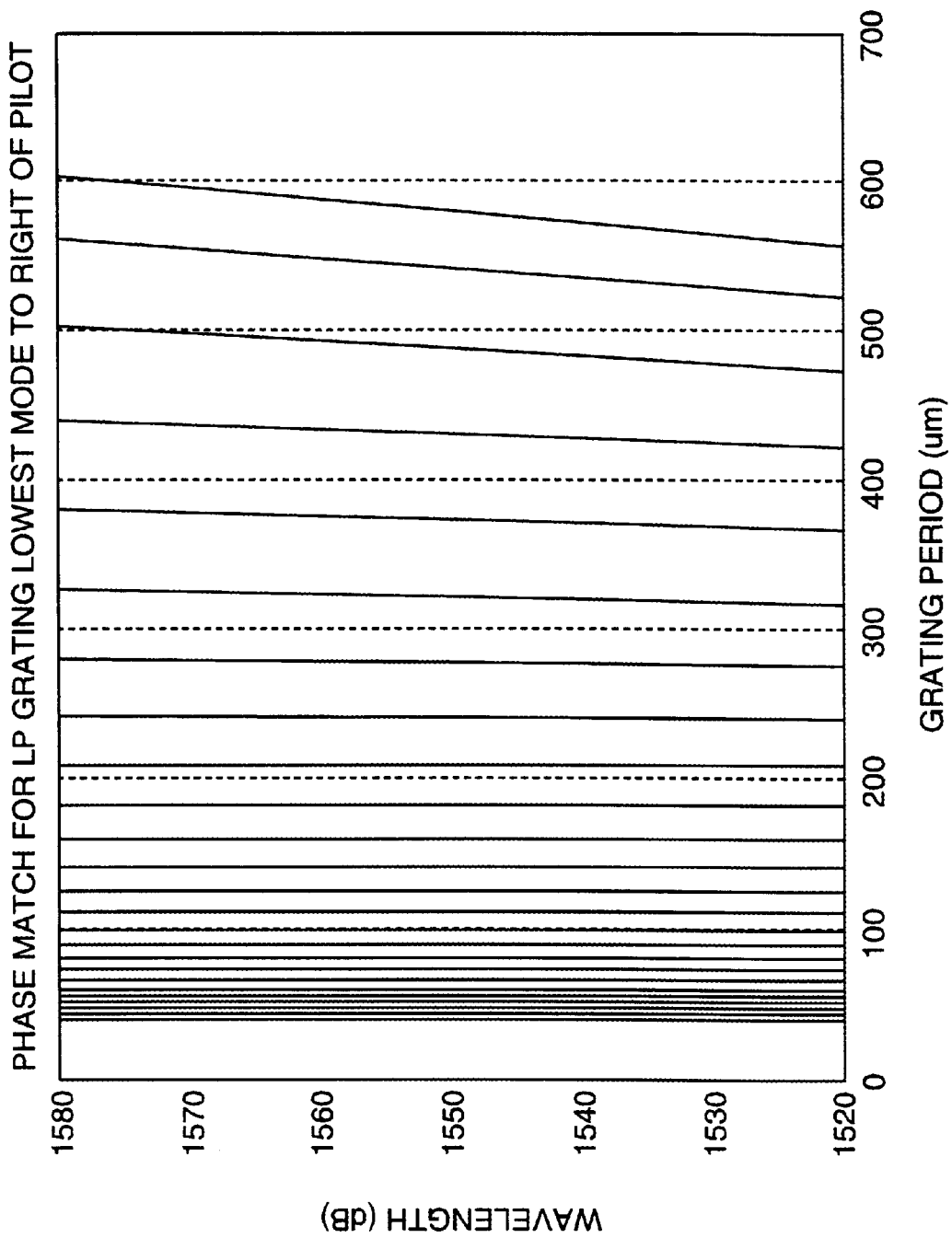
FIG. 3 is a plot of the center wavelength verses perturbation spacing for coupling between a guided core mode and several non-guided cladding modes.

Referring to FIG. 3, the results of the eigenvalue calculations can be used to generate graphs of the center wavelength versus perturbation spacing. Each solid line in the graph represents coupling between the guided core mode and a single non-guided cladding mode. The non-guided cladding modes are numbered in ascending order from right to left. The results of the eigenvalue calculation also can be used to determine the slope, $d\lambda/dL$, for each non-guided cladding mode. As can be seen from the graph, the lowest non-guided cladding modes have a positive slope, $d\lambda/dL>0$. Many of the higher non-guided cladding modes, however, have a negative slope. The slope, $d\lambda/dL$, is related to the LPG strain coefficient, $d\lambda/d\epsilon$, by Eq. 5:

$$d\lambda/d\epsilon = (d\lambda/dL)L \quad (5)$$

where L is the grating spacing at room temperature, and also represents the change in the perturbation spacing per change in strain. Therefore, the strain coefficient is negative when the slope, $d\lambda/dL$, is negative. Thus, a LPG is designed to have a negative strain coefficient by fabricating the LPG such that the center wavelength coupling occurs between a guided core mode and an higher non-guided cladding mode having a negative slope, $d\lambda/dL<0$.

Figure 4:
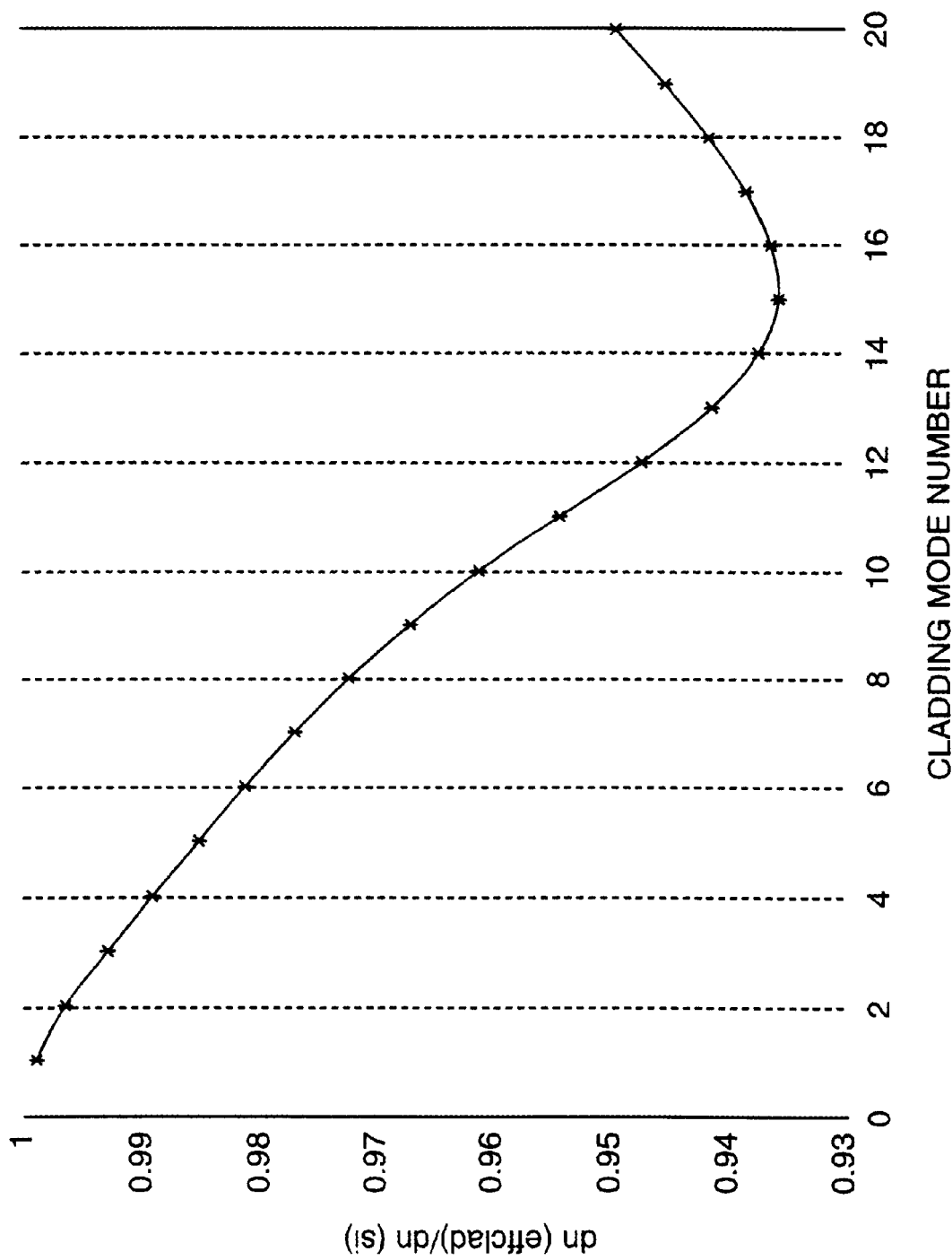
FIG. 4 is a plot of the change in the effective index of refraction per change in the effective index of refraction of $SiO_2$ versus non-guided cladding mode.

In addition to the slope, each non-guided cladding mode also has a $dn_{effclad}/dn_{SiO2}$ value. Referring to FIG. 4, results from the eigenvalue problem are used to plot the $dn_{effclad}/dn_{SiO2}$ value versus non-guided cladding mode. Each non-guided cladding mode has a unique set of $d\lambda/dL$ and $dn_{effclad}/dn_{SiO2}$ values. Therefore, for a specific center wavelength, several non-guided cladding mode values are used. in Eq. 4 to determine which mode is most effectively, compensated.

Note that in the embodiments described above, the coating of the optical fiber is removed to transfer-strain directly from the thermally expanding support through the cladding and the core to the LPG. A passively compensated LPG device can be made without removing the coating. The optical fiber with coating is attached to a support material. The CTE of the support material needed for passive compensation is calculated by incorporating the strain and thermal responses of the coating into Eq. 3.

Although a passively compensated LPG device is described above, an optical fiber having a LPG also can be actively compensated.

Other embodiments are within the scope of the following claims.

What is claimed is:

1. A method of fabricating a passively compensated optical fiber comprising:

identifying the strain response and thermal response for a long-period grating having a central wavelength, choosing a support member having a coefficient of linear expansion which compensates the optical fiber, attaching the optical fiber to the support member at a first attachment point and at a second attachment point.

2. A method of fabricating a passively compensated optical fiber comprising:

calculating an optical fiber design for compensating an optical fiber having a center wavelength and a substrate having a coefficient of thermal expansion, manufacturing an optical fiber having a long-period grating fabricated using the calculated optical fiber design, attaching the fabricated optical fiber to a support member at a first attachment point and at a second attachment point.

3. The method of claim 1, wherein the compensation is done passively.

* * * * *

UNITED STATES PATENT AND TRADEMARK OFFICE
CERTIFICATE OF CORRECTION

PATENT NO.     : 6,529,671 B2
DATED          : March 4, 2003
INVENTOR(S)    : MacDougall, Trevor W.

It is certified that error appears in the above-identified patent and that said Letters Patent is hereby corrected as shown below:

Column 2,
Line 60, delete "250ºC" and insert in place thereof -- 25ºC --.

Column 3,
Line 65, delete the equation " $\dfrac{d\lambda}{dT}\Delta T + \dfrac{d\lambda}{d\epsilon}\Delta\epsilon$ " and insert in place thereof -- $\dfrac{d\lambda}{dT}\Delta T = -\dfrac{d\lambda}{d\epsilon}\Delta\epsilon$ --.

Column 4,
Line 38, delete "250ºC" and insert in place thereof -- 25ºC --.

Signed and Sealed this

Ninth Day of September, 2003

JAMES E. ROGAN
*Director of the United States Patent and Trademark Office*